United States Patent
Wang et al.

(10) Patent No.: US 11,232,163 B2
(45) Date of Patent: Jan. 25, 2022

(54) METHOD AND APPARATUS FOR ECOMMERCE SEARCH RANKING

(71) Applicant: Walmart Apollo, LLC, Bentonville, AR (US)

(72) Inventors: Zhenrui Wang, Fremont, CA (US); Onur Gungor, Sunnyvale, CA (US); Sreenivasa Prasad Sista, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 161 days.

(21) Appl. No.: 16/111,163

(22) Filed: Aug. 23, 2018

(65) Prior Publication Data
US 2020/0065421 A1 Feb. 27, 2020

(51) Int. Cl.
*G06F 16/9535* (2019.01)
*G06N 7/00* (2006.01)
(Continued)

(52) U.S. Cl.
CPC .... *G06F 16/9535* (2019.01); *G06F 16/90335* (2019.01); *G06N 7/005* (2013.01); *G06Q 30/0641* (2013.01)

(58) Field of Classification Search
CPC ............ G06Q 30/0641; G06Q 30/0629; G06F 16/9535; G06N 7/005
(Continued)

(56) References Cited

U.S. PATENT DOCUMENTS

| 7,483,846 B1 * | 1/2009 | Kumar | G06Q 30/02 |
| | | | 705/14.35 |
| 7,693,818 B2 * | 4/2010 | Majumder | G06F 16/951 |
| | | | 707/999.002 |

(Continued)

FOREIGN PATENT DOCUMENTS

| CN | 104063523 A | * | 9/2014 | |
| WO | WO-2012095768 A1 | * | 7/2012 | ......... G06F 16/9535 |

OTHER PUBLICATIONS

Takanobu et al., "Aggregating e-commerce search results from heterogeneous sources via hierarchical reinforcement learning," The World Wide Web Conference, 2019, pp. 1771-1781.

(Continued)

*Primary Examiner* — Phuong Thao Cao
(74) *Attorney, Agent, or Firm* — Duane Morris LLP; Manita Rawat

(57) ABSTRACT

An e-commerce search ranking system is provided and generally includes a server (e.g., application server), a database, and a customer computing device. The server can obtain user search query listings associated with a search term of users' search sessions to determine user engagement of the items. The server also determines that the items, and any items appearing before the items in each user search query listing, were examined. The server can then aggregate the information in the database. The server can also determine additional search terms related to the search term of the users' search session, and obtain user search query listings for the additional search terms. The server can determine user engagement for items appearing in those user search query listings, and can aggregate that information in the database as well. The aggregated information can be used to determine a final item ranking for a search request inquiry.

17 Claims, 6 Drawing Sheets

(51) Int. Cl.
*G06Q 30/06* (2012.01)
*G06F 16/903* (2019.01)

(58) Field of Classification Search
USPC .......................................................... 707/723
See application file for complete search history.

(56) References Cited

U.S. PATENT DOCUMENTS

| | | | | |
|---|---|---|---|---|
| 7,756,887 | B1* | 7/2010 | Haveliwala | G06F 16/9535 707/769 |
| 8,117,066 | B1* | 2/2012 | Walcott | G06Q 30/0241 705/14.4 |
| 8,117,197 | B1* | 2/2012 | Cramer | G06F 16/248 707/731 |
| 8,176,043 | B2* | 5/2012 | Iwasa | G06F 16/73 707/723 |
| 8,417,713 | B1* | 4/2013 | Blair-Goldensohn | G06F 16/9535 707/751 |
| 8,463,769 | B1* | 6/2013 | Enderton | G06Q 10/00 707/713 |
| 8,589,395 | B2* | 11/2013 | Singh | G06F 16/951 707/736 |
| 8,626,823 | B2* | 1/2014 | Kumar | G06Q 10/107 707/721 |
| 9,055,343 | B1* | 6/2015 | Lewis | H04N 21/4826 |
| 9,372,893 | B2* | 6/2016 | Lin | G06F 16/9535 |
| 9,501,549 | B1* | 11/2016 | Wang | G06F 16/951 |
| 9,817,846 | B1 | 11/2017 | Srinivasan et al. | |
| 9,846,898 | B2* | 12/2017 | Rehman | G06Q 10/10 |
| 10,127,596 | B1* | 11/2018 | Franke | G06Q 30/0631 |
| 10,332,181 | B1* | 6/2019 | McAllister | G06F 16/24578 |
| 10,346,870 | B1* | 7/2019 | Chang | G06Q 30/0242 |
| 10,423,985 | B1* | 9/2019 | Dutta | H04L 67/22 |
| 10,572,925 | B1* | 2/2020 | Chowdhury | G06Q 30/0625 |
| 2002/0062245 | A1* | 5/2002 | Niu | G06Q 30/02 705/14.51 |
| 2002/0095327 | A1* | 7/2002 | Zumel | G06Q 30/06 705/400 |
| 2006/0167757 | A1* | 7/2006 | Holden | G06Q 30/06 705/27.2 |
| 2007/0005587 | A1* | 1/2007 | Johnson | G06F 16/9535 |
| 2007/0100653 | A1* | 5/2007 | Ramer | G06Q 30/06 705/1.1 |
| 2007/0112768 | A1* | 5/2007 | Majumder | G06F 16/951 |
| 2007/0266025 | A1* | 11/2007 | Wagner | G06F 16/9535 |
| 2008/0092159 | A1* | 4/2008 | Dmitriev | G06Q 30/04 725/34 |
| 2008/0114751 | A1* | 5/2008 | Cramer | G06F 16/9535 |
| 2008/0133417 | A1* | 6/2008 | Robinson | G06Q 30/0282 705/52 |
| 2009/0248661 | A1* | 10/2009 | Bilenko | G06F 16/951 |
| 2009/0327267 | A1* | 12/2009 | Wong | G06F 16/3349 |
| 2010/0082566 | A1* | 4/2010 | Wang | G06F 16/951 707/705 |
| 2010/0262495 | A1* | 10/2010 | Dumon | G06Q 30/02 705/14.54 |
| 2010/0312764 | A1* | 12/2010 | Liao | G06F 16/338 707/723 |
| 2011/0010323 | A1* | 1/2011 | Wang | G06F 9/451 706/46 |
| 2011/0035379 | A1* | 2/2011 | Chen | G06K 9/6226 707/740 |
| 2011/0078049 | A1* | 3/2011 | Rehman | G06Q 30/0282 705/27.1 |
| 2011/0184806 | A1* | 7/2011 | Chen | G06Q 30/02 705/14.52 |
| 2011/0202513 | A1* | 8/2011 | Singh | G06F 16/9535 707/706 |
| 2011/0307411 | A1* | 12/2011 | Bolivar | G06Q 30/0282 705/347 |
| 2013/0054622 | A1* | 2/2013 | Karmarkar | G06F 16/436 707/749 |
| 2013/0083999 | A1* | 4/2013 | Bhardwaj | G06F 16/5838 382/165 |
| 2013/0124449 | A1* | 5/2013 | Pinckney | G06N 5/045 706/52 |
| 2013/0132378 | A1* | 5/2013 | Gilad-Bachrach | G06F 16/9535 707/723 |
| 2013/0204859 | A1* | 8/2013 | Vijaywargi | G06F 16/9535 707/709 |
| 2013/0204886 | A1 | 8/2013 | Faith et al. | |
| 2014/0025668 | A1* | 1/2014 | Lin | G06F 16/9535 707/723 |
| 2014/0379528 | A1* | 12/2014 | Martin | G06F 3/04817 705/26.62 |
| 2015/0007064 | A1* | 1/2015 | Givoni | G06F 16/958 715/760 |
| 2015/0032717 | A1* | 1/2015 | Cramer | G06F 16/24575 707/709 |
| 2015/0058332 | A1* | 2/2015 | Patterson | G06F 16/248 707/723 |
| 2015/0339754 | A1* | 11/2015 | Bloem | G06F 16/9535 705/26.7 |
| 2016/0085813 | A1* | 3/2016 | Setty | G06K 9/00671 705/26.3 |
| 2016/0330155 | A1* | 11/2016 | Moreau | G06F 3/0481 |
| 2017/0061286 | A1* | 3/2017 | Kumar | G06Q 30/0269 |
| 2017/0075897 | A1* | 3/2017 | Nikulin | G06F 16/9535 |
| 2017/0091192 | A1* | 3/2017 | Kuralenok | G06F 16/248 |
| 2017/0109413 | A1* | 4/2017 | Gholami | G06Q 30/02 |
| 2017/0140006 | A1* | 5/2017 | Yang | G06F 3/04812 |
| 2017/0193072 | A1* | 7/2017 | Vase | G06Q 30/0623 |
| 2017/0221120 | A1* | 8/2017 | Pathak | G06F 16/951 |
| 2017/0262925 | A1* | 9/2017 | Kannadasan | G06F 16/9535 |
| 2017/0316483 | A1* | 11/2017 | Lester | G06Q 30/0641 |
| 2018/0052848 | A1* | 2/2018 | Barron | G06F 16/2455 |
| 2018/0189282 | A1* | 7/2018 | Hartlaub | G06F 16/9535 |
| 2018/0211333 | A1* | 7/2018 | Lackman | G06Q 50/01 |
| 2018/0218087 | A1* | 8/2018 | Rapaka | H04L 67/306 |
| 2018/0260486 | A1* | 9/2018 | Howard | G06F 16/9535 |
| 2018/0349499 | A1* | 12/2018 | Pawar | G06F 16/24578 |
| 2019/0005575 | A1* | 1/2019 | Zeldin | G06Q 30/08 |
| 2019/0019235 | A1* | 1/2019 | Sprangers | G06Q 30/0641 |
| 2019/0171689 | A1* | 6/2019 | Kachkach | G06F 16/9535 |
| 2019/0205472 | A1* | 7/2019 | Kulkarni | G06F 3/04812 |
| 2019/0236158 | A1* | 8/2019 | Cao | G06F 16/9538 |
| 2019/0340256 | A1* | 11/2019 | Kulkarni | G06F 16/9535 |
| 2019/0354638 | A1 | 11/2019 | Kievit-Kylar | |
| 2019/0385219 | A1* | 12/2019 | Ouyang | G06N 5/048 |

OTHER PUBLICATIONS

Jabeur et al., "A Product Feature-based User-Centric Ranking Model for E-Commerce Search," 2016, pp. 1-13.

Bhagat et al., "Buy It Again: Modeling Repeat Purchase Recommendations," 2018, pp. 62-70.

* cited by examiner

METHOD AND APPARATUS FOR ECOMMERCE SEARCH RANKING

CROSS-REFERENCE TO RELATED APPLICATIONS

This application is related to U.S. patent application Ser. No. 16/111,177, filed simultaneously on Aug. 23, 2018, which is herein incorporated by reference.

TECHNICAL FIELD

The disclosure relates generally to e-commerce and, more specifically, to ranking online search results.

BACKGROUND

At least some known online retailers allow customers to place purchase orders remotely through a purchasing system. For example, some retailers use at least some known purchasing systems that allow customers to place purchase orders through the retailer's website. As another example, some retailers allow customers to place purchase orders through an application ("App") executing on a mobile device, such as a cellular phone. Often times, the retailer's website or App allows a customer to search for an item (e.g., product). Typically, the customer is able to input a search term into a search box (i.e., a search request), and, upon executing the search, items relating to the search term are provided to the customer. The items may be listed in an order as ranked by the website or App. For example, the items may be listed in an order based on item attributes such as item brand, price, reviews, or order history. These currently methodologies of ranking items, however, are unable to provide search results in a more relevant ranking order in response to a customer's search request.

SUMMARY

The embodiments described herein allow for search results to be provided to a customer in a more relevant ranking order than traditional methodologies. For example, customers do not have to scroll through as many items, or pages of items, to locate the item they may ultimately purchase. Moreover, some customers may either stop scrolling, or proceed to another retailer's website, if they do not quickly find an item of interest. As such, an online retailer incorporating one or more of the embodiments can benefit from additional sales by providing search results to the customer in a ranking order such that items that are more likely to be purchased are provided before others. Other benefits would also be recognized by those skilled in the art.

For example, in some embodiments, an e-commerce search ranking system is provided that includes a search ranking computing device (e.g., a server) and a database. The search ranking computing device can obtain a user search query listing associated with a search term of a user's search session from the database. The search ranking computing device can determine, based on the user search query listing, at least one item that the user engaged (e.g., clicked on). Based on the determined item, the search ranking computing device can generate (e.g., determine) user item engagement data for each of a plurality of items of the user search query listing. The user item engagement data can indicate that the user examined (e.g., reviewed or looked at) the at least one item, and engaged (e.g., clicked on, added to online shopping cart, or ordered), the at least one item. The user item engagement data can also indicate that the user examined any items appearing before the determined item in the user search query listing. The search ranking computing device can provide the user item engagement data for a final item ranking, such as one in response to a search request.

In some embodiments, an e-commerce search ranking system is provided that includes a search ranking computing device and a database. The search ranking computing device can obtain a search term of a user's search session from the database, and can determine additional search terms related to the search term of the user's search session. Based on the additional search terms, the search ranking computing device can obtain from the database a plurality of user search query listings. For each user search query listing of the plurality of user search query listings, the search ranking computing device can generate (e.g., determine) user item engagement data for an item (e.g., a same item). The search ranking computing device can aggregate the user item engagement data for each of the user search query listings of the plurality of user search query listings for a particular item with each other to generate (e.g., determine) global aggregated item engagement data for the item. The search ranking computing device can provide the global aggregated item engagement data for a final item ranking.

In some embodiments, the e-commerce search ranking system can determine a probability of a conversion of an item (e.g., probability of the item being bought) based on a beta distribution derived from a Bayesian analysis of user item engagement data. For example, the search ranking computing device can determine a first probability of conversion based on a first beta distribution derived from a first Bayesian analysis of an item engagement count and an item examination count. The search ranking computing device can also determine a second probability of conversion based on a second beta distribution derived from a second Bayesian analysis of an item add-to-cart count and the item engagement count. The search ranking computing device can additionally determine a third probability of conversion based on a third beta distribution derived from a third Bayesian analysis of an item conversion count and the item add-to-cart count. The search ranking computing device can then combine the first, second, and third probabilities of conversion to provide an output score that can be used to determine a final search ranking. In some examples, the e-commerce search ranking system determines the probability of conversion of the item based on a beta distribution derived from a Bayesian analysis of aggregated item engagement data.

In some embodiments, a method by a search ranking computing device includes obtaining a user search query listing associated with a search term of a user's search session from a database and determining, based on the user search query listing, at least one item that the user engaged. The method further includes, based on determining the at least one item that the user engaged, generating (e.g., determining) user item engagement data for each of a plurality of items of the user search query listing. The user item engagement data can indicate that the user examined and engaged the at least one item, and that the user examined any items appearing before the at least one item in the user search query listing. The method can further include providing the user item engagement data for a final item ranking.

In some embodiments, a method includes obtaining a search term of the user's search session from a database, and determining additional search terms related to the search term of the user's search session. The method further includes obtaining from the database a plurality of user search query listings based on the additional search terms. For each user search query listing of the plurality of user search query listings, the method includes generating (e.g., determining) user item engagement data for at least one item. The method can also include generating (e.g., determining) global aggregated item engagement data for the at least one item. The global aggregated item engagement data is generated based on aggregating user item engagement data for each of the user search query listings of the plurality of user search query listings with each other. The method can also include providing the global aggregated item engagement data for a final item ranking.

In some examples, a method can include determining a probability of a conversion of at least one item based on a beta distribution derived from a Bayesian analysis of user item engagement data. For example, determining the probability of the conversion of the at least one item can include determining a first probability of conversion based on a first beta distribution derived from a first Bayesian analysis of an item engagement count and an item examination count. The method can further include determining a second probability of conversion based on a second beta distribution derived from a second Bayesian analysis of an item add-to-cart count and the item engagement count. The method can also include determining a third probability of conversion based on a third beta distribution derived from a third Bayesian analysis of an item conversion count and the item add-to-cart count. The method can further include combining the first, second, and third probabilities of conversion to provide an output score that can be used to determine a final search ranking. In some examples, the method determines the probability of conversion of the item based on a beta distribution derived from a Bayesian analysis of aggregated item engagement data.

In some examples a non-transitory, computer-readable storage medium includes executable instructions that, when executed by one or more processors, cause the one or more processors to obtain a user search query listing associated with a search term of a user's search session from a database and determine, based on the user search query listing, at least one item that the user engaged. The executable instructions, when executed by the one or more processors, can also cause the one or more processors to generate (e.g., determine) user item engagement data for each of a plurality of items of the user search query listing. The user item engagement data can indicate that the user examined and engaged the at least one item, and that the user examined any items appearing before the at least one item in the user search query listing. The executable instructions, when executed by the one or more processors, can also cause the one or more processors to provide the user item engagement data for a final item ranking.

In some examples a non-transitory, computer-readable storage medium includes executable instructions that, when executed by one or more processors, cause the one or more processors to obtain a search term of the user's search session from a database, and to determine additional search terms related to the search term of the user's search session. The executable instructions, when executed by the one or more processors, can also cause the one or more processors to obtain from the database a plurality of user search query listings based on the additional search terms. The executable instructions, when executed by the one or more processors, can cause the one or more processors to, for each user search query listing of the plurality of user search query listings, generate (e.g., determine) user item engagement data for at least one item, such as the same item. The executable instructions, when executed by the one or more processors, can also cause the one or more processors to generate (e.g., determine) global aggregated item engagement data for the at least one item based on aggregating the user item engagement data for each of the user search query listings of the plurality of user search query listings with each other. The executable instructions, when executed by the one or more processors, can cause the one or more processors to provide the global aggregated item engagement data for a final item ranking.

In some examples, a non-transitory, computer-readable storage medium includes executable instructions that, when executed by one or more processors, cause the one or more processors to determine a probability of a conversion of the at least one item based on a beta distribution derived from a Bayesian analysis of user item engagement data. For example, the executable instructions, when executed by the one or more processors, can cause the one or more processors to determine a first probability of conversion based on a first beta distribution derived from a first Bayesian analysis of an item engagement count and an item examination count of the global aggregated item engagement data; determine a second probability of conversion based on a second beta distribution derived from a second Bayesian analysis of an item add-to-cart count and the item engagement count of the global aggregated item engagement data; and determine a third probability of conversion based on a third beta distribution derived from a third Bayesian analysis of an item conversion count and the item add-to-cart count of the global aggregated item engagement data. The executable instructions, when executed by the one or more processors, can also cause the one or more processors to combine the first, second, and third probabilities of conversion to provide an output score that can be used to determine a final search ranking. In some examples, the non-transitory, computer-readable storage medium includes executable instructions that, when executed by one or more processors, cause the one or more processors to determine the probability of conversion of the item based on a beta distribution derived from a Bayesian analysis of aggregated item engagement data.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
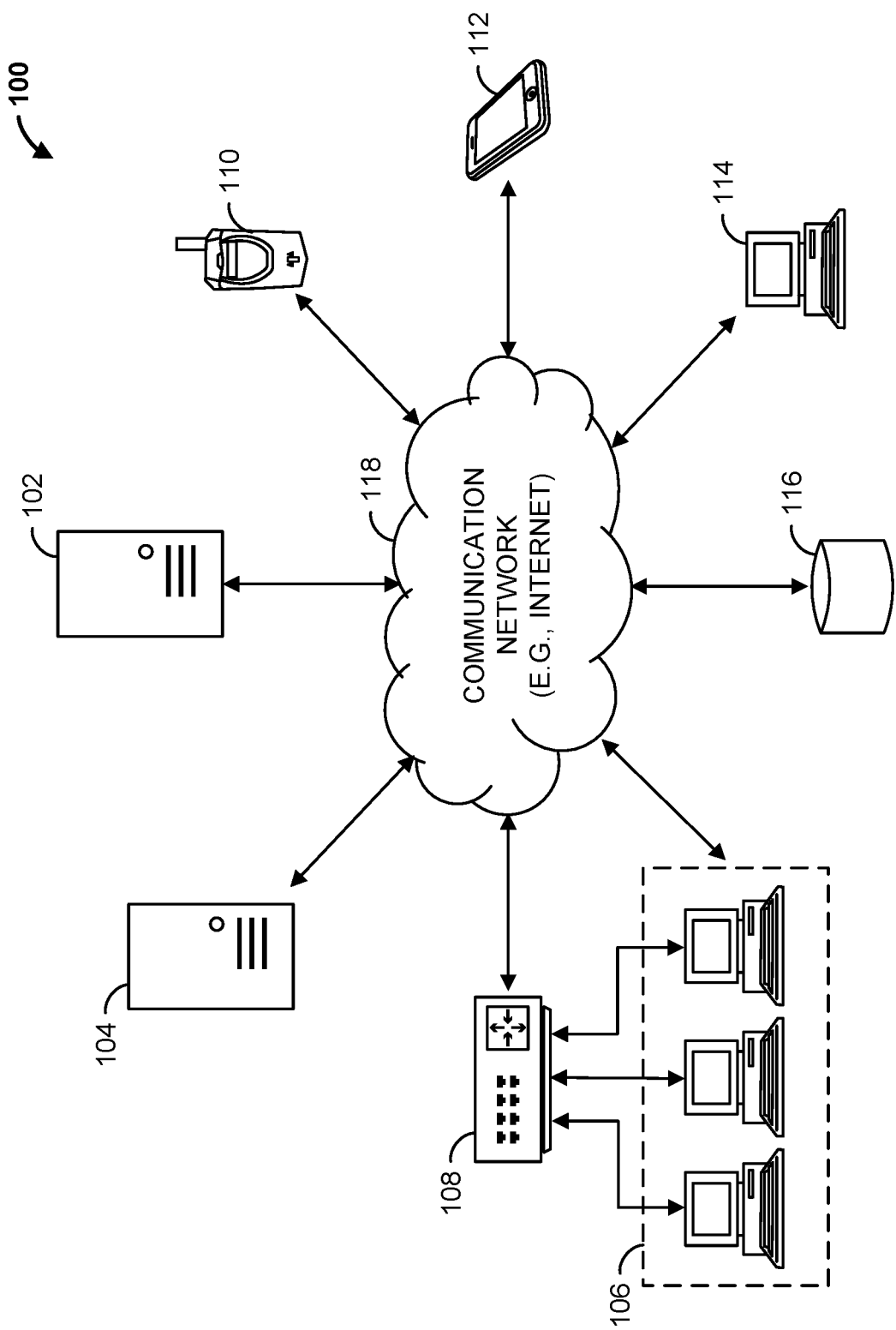
FIG. 1 is a block diagram of an e-commerce search ranking system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an e-commerce search ranking system 100 that includes a search ranking computing device 102 (e.g., a server, such as an application server), a web hosting device (e.g., a web server) 104, workstation(s) 106, database 116, and multiple customer computing devices 110, 112, 114. Search ranking computing device 102, web hosting device 104, and multiple customer computing devices 110, 112, 114 can each be any suitable computing device that includes any hardware or hardware and software combination for processing and handling information. In addition, each can transmit data to, and receive data from, communication network 118. For example, each of these devices can be a computer, a workstation, a laptop, a mobile device such as a cellular phone, a cloud-based server, or any other suitable device. Each can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, e-commerce search ranking system 100 can include any number of customer computing devices 110, 112, 114. Similarly, e-commerce search ranking system 100 can include any number of workstation(s) 106, search ranking computing devices 102, web servers 104, and databases 116.

Workstation(s) 106 are operably coupled to communication network 118 via router (or switch) 108. For example, workstation(s) 106 can communicate with search ranking computing device 102 over communication network 118. The workstation(s) 106 can allow for the configuration and/or programming of search ranking computing device 102, such as the controlling and/or programming of one or more processors of search ranking computing device 102 (described further below with respect to FIG. 2).

Search ranking computing device 102 and workstation(s) 106 can be operated by a retailer. Customer computing devices 110, 112, 114 can be computing devices operated by customers of a retailer. Search ranking computing device 102 is operable to communicate with database 116 over communication network 118. For example, search ranking computing device 102 can store data to, and read data from, database 116. Database 116 can be a remote storage device, such as a cloud-based server, a memory device on another application server, a networked computer, or any other suitable remote storage. Although shown remote to search ranking computing device 102, in some examples database 116 can be a local storage device, such as a hard drive, a non-volatile memory, or a USB stick.

Communication network 118 can be a WiFi® network, a cellular network such as a 3GPP® network, a Bluetooth® network, a satellite network, or any other suitable network. Communication network 118 can provide access to, for example, the Internet.

Search ranking computing device 102 can also communicate with first customer computing device 110, second customer computing device 112, and Nth customer computing device 114 over communication network 118. Similarly, first customer computing device 110, second customer computing device 112, and Nth customer computing device 114 are operable to communicate with search ranking computing device 102 over communication network 118. For example, search ranking computing device 102 can receive data (e.g., messages) from, and transmit data to, first customer computing device 110, second customer computing device 112, and Nth customer computing device 114.

E-commerce search ranking system 100 allows for the generation, and aggregation, of user item engagement data that can be used for item rankings in response to search requests. User item engagement data can include one or more of an examination count, engagement (e.g., click) count, add-to-cart indication/count (e.g., indication that the item was added to a website's shopping cart), and conversion indication/count (e.g., an indication that the item was purchased). For example, search ranking computing device 102 can obtain a user search query listing from database 116. The user search query listing can include a search term and search results of a user's search session, such as a search session the user may have engaged while visiting a retailer's website hosted by web server 104. The user search query listing can also include an indication of which items the user clicked on (e.g., a click log) during the user's search session.

Search ranking computing device 102 can generate, based on the obtained user search query listing, user item engagement data for one or more items associated with the user search query listing. For example, search ranking computing device 102 can identify (e.g., determine) an item that the user clicked on during the user's search session. The identified item can be one that was added to the website's shopping cart during the user's search session. A click log may indicate which items were added to a user's shopping cart. Search ranking computing device 102 can also determine that the user examined any items appearing before the identified item in the user search query listing.

As an example, assume that user search query listing indicates that items A, B, C, and D appeared in the search result, and that item C was added to the website's shopping cart. In this example, search ranking computing device 102 can determine user that item C was examined (e.g., reviewed) and added to the website's shopping cart, and that items A and B, which appear before item C in the user search query listing, were examined. Search ranking computing device 102 can also determine that item D, which does not appear before item C, was not examined. Search ranking computing device 102 may then generate user item engagement data for one or more items appearing in the user search query listing. For example, user item engagement data for items A and B may indicate that they were examined during the user's search session, and that item C was examined and added to the website's shopping cart. Search ranking computing device 102 may then store the user item engagement data to database 116. For example, the user item engagement data may be stored to database 116 based on (e.g., categorized by) a search term associated with each user search query listing.

In some examples, search ranking computing device 102 updates the user search query listing for the user's search session with user item engagement data. For example, in continuing the above example, search ranking computing device 102 can update the user search query listing indicating that items A, B, C, and D appeared in the search result, with data indicating that items A, B, and C were examined.

In some examples, search ranking computing device 102 can obtain a search term of a user's search session from database 116, such as one associated with a user search query listing. Search ranking computing device 102 can then determine additional search terms related to the search term of the user's search session. For example, the additional search terms may be determined by executing one or more lemmatization algorithms based on the search term. As another example, a query understanding service may be employed to determine the additional search terms. The query understanding service may include, for example, a database with terms that are to be associated with each other such as, for example, "tv" with "television." Based on the additional search terms, search ranking computing device 102 can obtain from database 116 a plurality of user search query listings. For example, a user search query listing associated with each of the additional search terms may be obtained. For each of the obtained user search query listings, search ranking computing device 102 can generate user item engagement data for one or more items. For an item appearing in multiple search query listings, search ranking computing device 102 can generate global aggregated item engagement data for the item by aggregating the item's corresponding user item engagement data for multiple search query listings. For example, search ranking computing device 102 may, for a same item, add one or more of examination counts, engagement counts, add-to-cart counts, and conversion counts for each of the multiple search query listings.

As an example, assume that a first user search query listing, associated with a first search term, indicates an item was clicked on 400 times, was added to a shopping cart 50 times, and was converted 20 times. Also assume that a second user search query listing, associated with a second search term different than the first search term, indicates the same item was clicked on 100 times, was added to a shopping cart 60 times, and was converted 40 times. Search ranking computing device 102 may aggregate this data to determine that the item was clicked on 500 times (400+100), the item was added to a shopping cart 110 times (50+60), and was converted 60 times (20+40). Search ranking computing device 102 can also store the aggregated item engagement data in database 116, which can be used to determine item rankings for future search requests.

In some examples, search ranking computing device 102 determines a probability of conversion of an item (e.g., probability that the item will be bought) based on a probability distribution derived from a Bayesian analysis of user item engagement data, or aggregated item engagement data.

As is recognized in the art, Bayesian analysis involves a method of statistical inference that uses Bayes' theorem (referenced herein as "Beta (alpha, beta)") to dynamically update the probability of a hypothesis as more user item engagement data becomes available. For example, alpha can be a number of engagements (e.g., engagement count), and beta can be a number of examinations (e.g., examination count), of an item. In some examples, alpha can be a number of times an item was added to a shopping cart (e.g., add-to-cart count), and beta can be the number of engagements of the item. In some examples, alpha can be a number of conversions (e.g., conversion count) of an item, and beta can be the number of times the item was added to a shopping cart.

In some examples, search ranking computing device 102 determines the probability of conversion of an item using the following steps. First, a first probability of conversion is determined based on a first Bayesian probability distribution defined by Beta (item engagement count, item examination count). For example, the first probability of conversion may be the most likely probability based on the first Bayesian probability distribution. A second probability of conversion for the item is determined based on a second Bayesian probability distribution defined by Beta (item add-to-cart count, item engagement count). The second probability of conversion may be the most likely probability based on the second Bayesian probability distribution. A third probability of conversion is also determined, and is based on a third Bayesian probability distribution defined by Beta (item conversion count, item add-to-cart count). The third probability of conversion may be the most likely probability based on the third Bayesian probability distribution.

Search ranking computing device 102 can then combine the three probabilities of conversion to determine a final probability. For example, search ranking computing device 102 may multiply the first, second, and third probabilities of conversion to determine a final item conversion probability. Search ranking computing device 102 can store the final item conversion probability in database 114, which can be accessed to determine final item rankings for user search requests.

If no data is available for a particular item, search ranking computing device 102 may determine the likelihood of conversion for an item based on Beta (1, 1). As more user item engagement data becomes available, search ranking computing device 102 can re-run the Bayean analysis.

In some examples, search ranking computing device 102 uses a lower quantile of the beta distribution to determine the probability of conversion, such as the first, second, and/or third probability of conversion. For example, if user item engagement data (or aggregated item engagement data) indicates engagement, examination, add-to-cart, or conversion counts below a threshold (e.g., 5%), search ranking computing device 102 may use a likelihood of probability that is found in the lower quantile (e.g., 5% quantile) of a corresponding Bayesian probability distribution, such as the first, second, or third Bayesian probability distribution described above.

Figure 2:
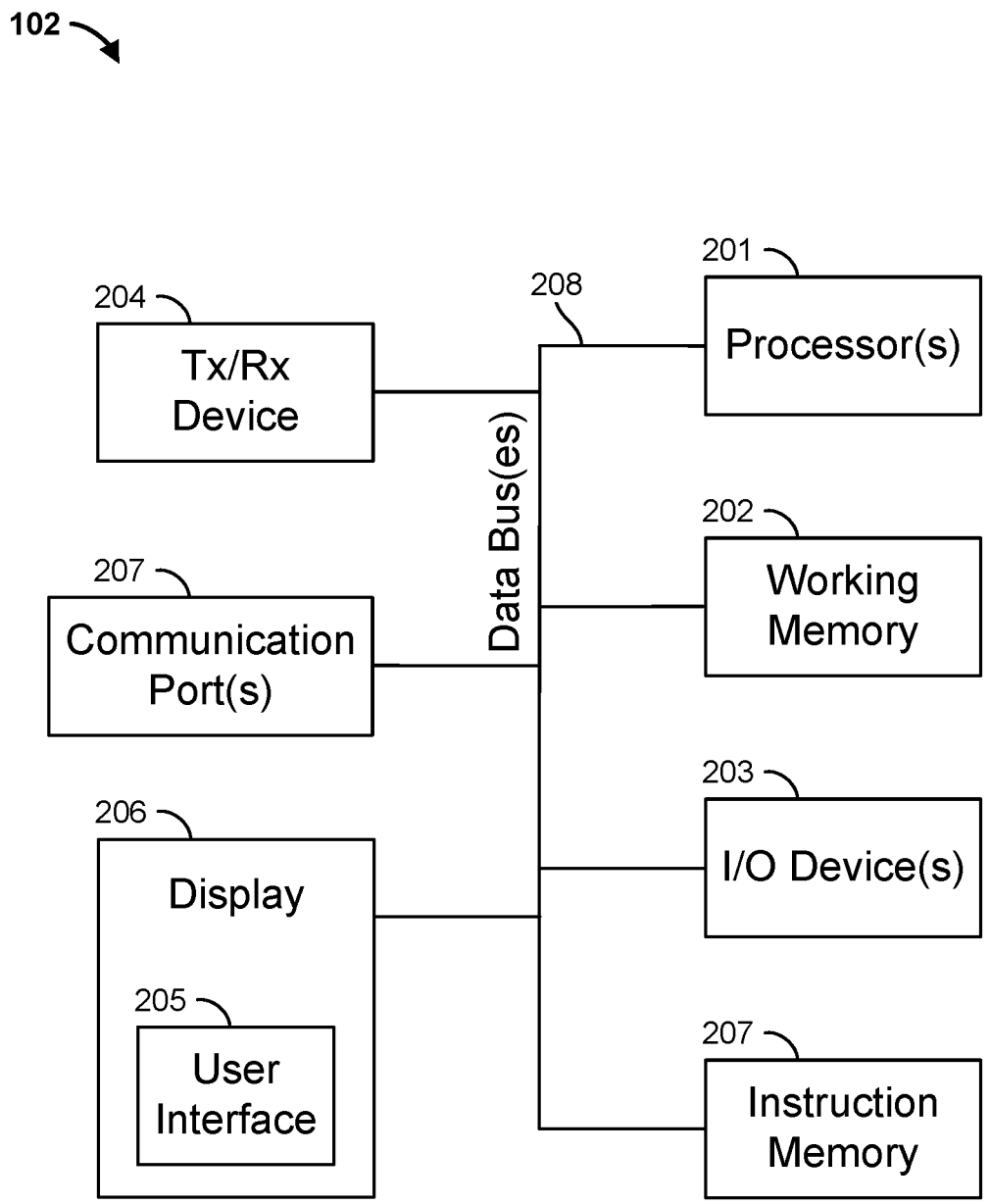
FIG. 2 is a block diagram of the search ranking computing device of the e-commerce search ranking system of FIG. 1 in accordance with some embodiments.

FIG. 2 illustrates the search ranking computing device 102 of FIG. 1. Search ranking computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of search ranking computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as user item engagement data, or aggregated item engagement data.

Display 206 can display user interface 205. User interfaces 205 can enable user interaction with search ranking computing device 102. For example, user interface 205 can be a user interface for an application that allows for the viewing of user item engagement data or aggregated item engagement data. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 search ranking computing device 102 will be operating in. Processor(s) 201 is operable to receive data from, or send data to, a network, such as communication network 118 of FIG. 1, via transceiver 204.

Figure 3:
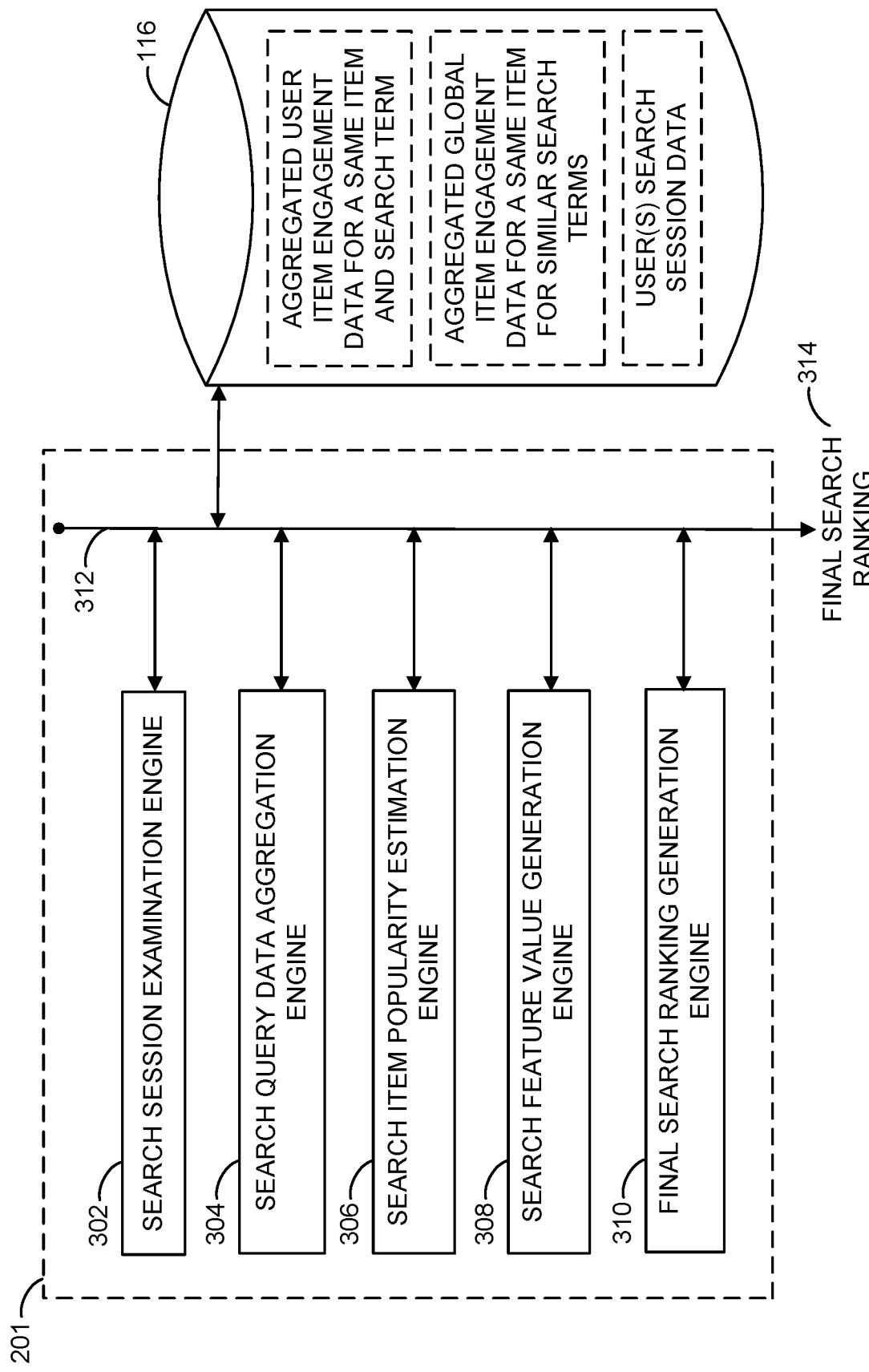
FIG. 3 is a block diagram illustrating an example of various portions of the search ranking computing device of FIG. 1, and a more detailed view of the database of FIG. 1, in accordance with some embodiments.

FIG. 3 is a block diagram illustrating an example of various portions of the search ranking computing device 102 of FIG. 1, along with a more detailed view of database 116 of FIG. 1. As indicated in the diagram, search session examination engine 302, search query data aggregation engine 304, search item popularity estimation engine 306, search feature value generation engine 308, and final search ranking generation engine 310 are all operatively coupled to database 116 over communication bus 312. In some examples, some or all of search session examination engine 302, search query data aggregation engine 304, search item popularity estimation engine 306, search feature value generation engine 308, and final search ranking generation engine 310 are implemented in processor(s) 201 of FIG. 2, and in executable instructions executed by processor(s) 201 of FIG. 2. In some examples, one or more of search session examination engine 302, search query data aggregation engine 304, search item popularity estimation engine 306, search feature value generation engine 308, and final search ranking generation engine 310 can be implemented in hardware, such as digital circuitry, FPGAs, ASICs, state machines, or any other suitable hardware.

Search session examination engine 302 is operable to obtain user search session data from database 116, which can include one or more user search query listings. Search session examination engine 302 can then determine that a user examined and engaged an item in a user search query listing, and that the user examined any items appearing before the item in the user search query listing. Search session examination engine 302 can generate and store this information as aggregated user item engagement data for a same item and search term in database 116.

Search query data aggregation engine 304 can obtain one or more user search query listings from database 116, and determine a first search term used for a one of the obtained user search query listings. Search query data aggregation engine 304 can also determine search terms related to the first search term, and obtain from the database one or more additional user search query listings based on the additional search terms. Search query data aggregation engine 304 can then aggregate user item engagement data for each of the additional user search query listings for a same item with each other, and with user engagement data associated with the first search term, to generate global item engagement data for a same item for similar terms. Search query data aggregation engine 304 can store the global item engagement data for a same item for similar terms in database 116.

Search item popularity estimation engine 306 can determine a probability of a conversion of an item based on a beta distribution derived from a Bayesian analysis of the aggregated item engagement data. For example, search item popularity estimation engine 306 can determine a probability of a conversion of an item based on a beta distribution derived from a Bayesian analysis of the aggregated user item engagement data generated by search session examination engine 302, or aggregated global item engagement data for a same item for similar terms generated by search query data aggregation engine 304. In some examples, search item popularity estimation engine determines a first, second, and third probability of conversion for an item as discussed above with respect to FIG. 1.

Search feature value generation engine 308 can obtain one or more probabilities of conversion for an item from search item popularity estimation engine 306 and determine a search feature value (e.g., factor, output score) that can be used in ranking items in response to search inquiries. For example, search feature value generation engine 308 can receive the first, second, and third probability of conversions for an item from search item popularity estimation engine 306 to determine the search feature value, and provide that to final search ranking generation engine 310 to determine item rankings in response to search inquiries.

Final search ranking generation engine 310 is operable to determine a final search ranking 314 in response to a search inquiry, where the final search ranking 314 includes an order of search results. For example, final search ranking generation engine 310 can receive a request to rank search results from, for example, web server 104 of FIG. 1. Based on aggregated user item engagement data for a same item and search term or aggregated global item engagement data for a same item for similar search terms, and a search feature value generated by search feature value generation engine 308, final search ranking generation engine 310 can determine the final search ranking 314. For example, final search ranking generation engine 310 may assign a weight to each of the received values to generate a final search ranking 314. For example, the received values may be multiplied by a corresponding weight, and the respective results may determine an order for the display of search results (e.g., results with higher values are displayed first).

Figure 4:
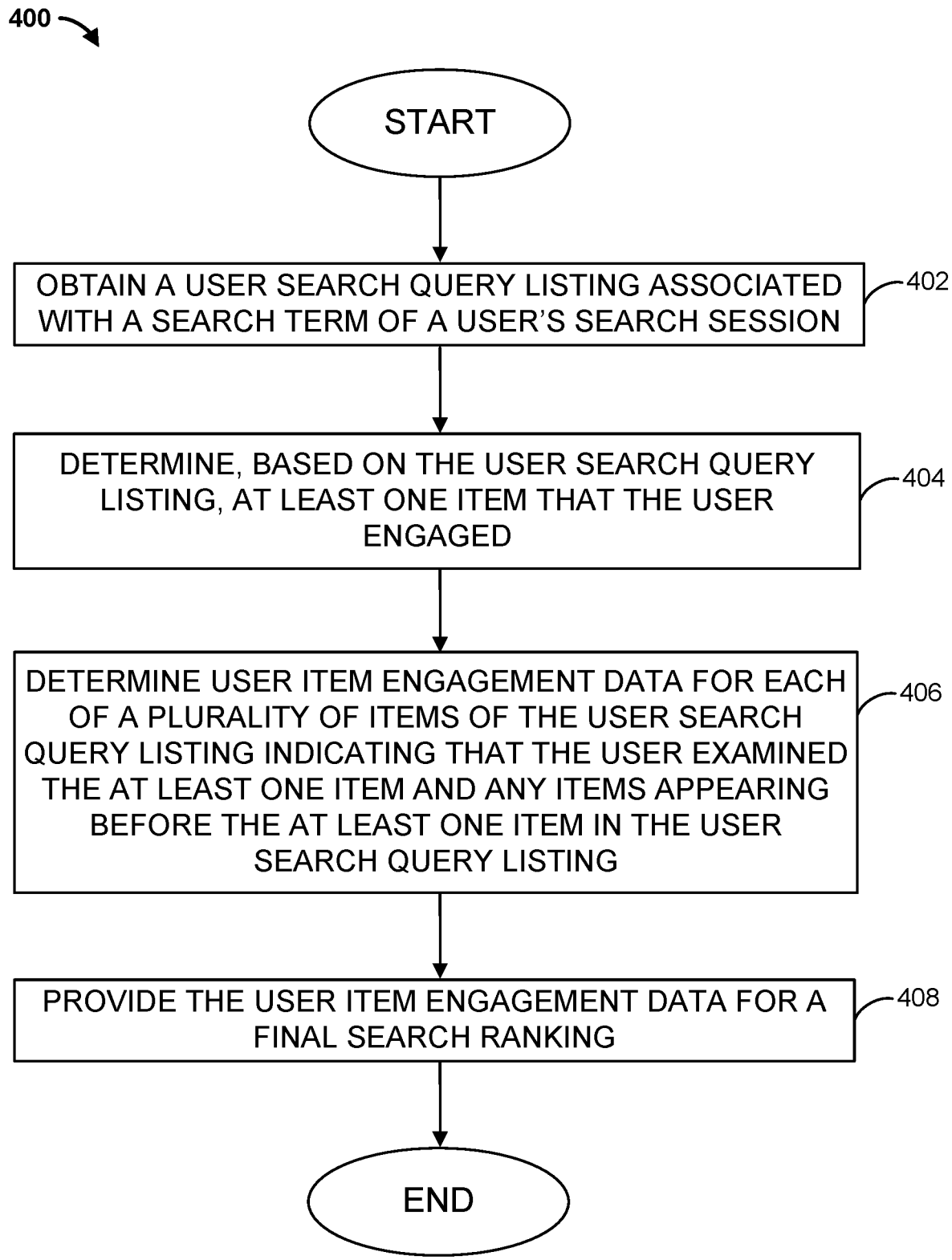
FIG. 4 is a flowchart of an example method that can be carried out by the e-commerce search ranking system of FIG. 1 in accordance with some embodiments.

FIG. 4 is a flowchart of an example method 400 that can be carried out by the search ranking computing device 102 of FIG. 1. At step 402, a user search query listing associated with a search term of a user's search session is obtained. At step 404, at least one item that the user engaged is determined based on the user search query listing. At step 406, for each of a plurality of items of the user search query listing, user item engagement data is determined that indicates the at least one item and any items appearing before the at least one item in the user search query listing were examined. The user item engagement data is provided for a final search ranking at step 408.

Figure 5:
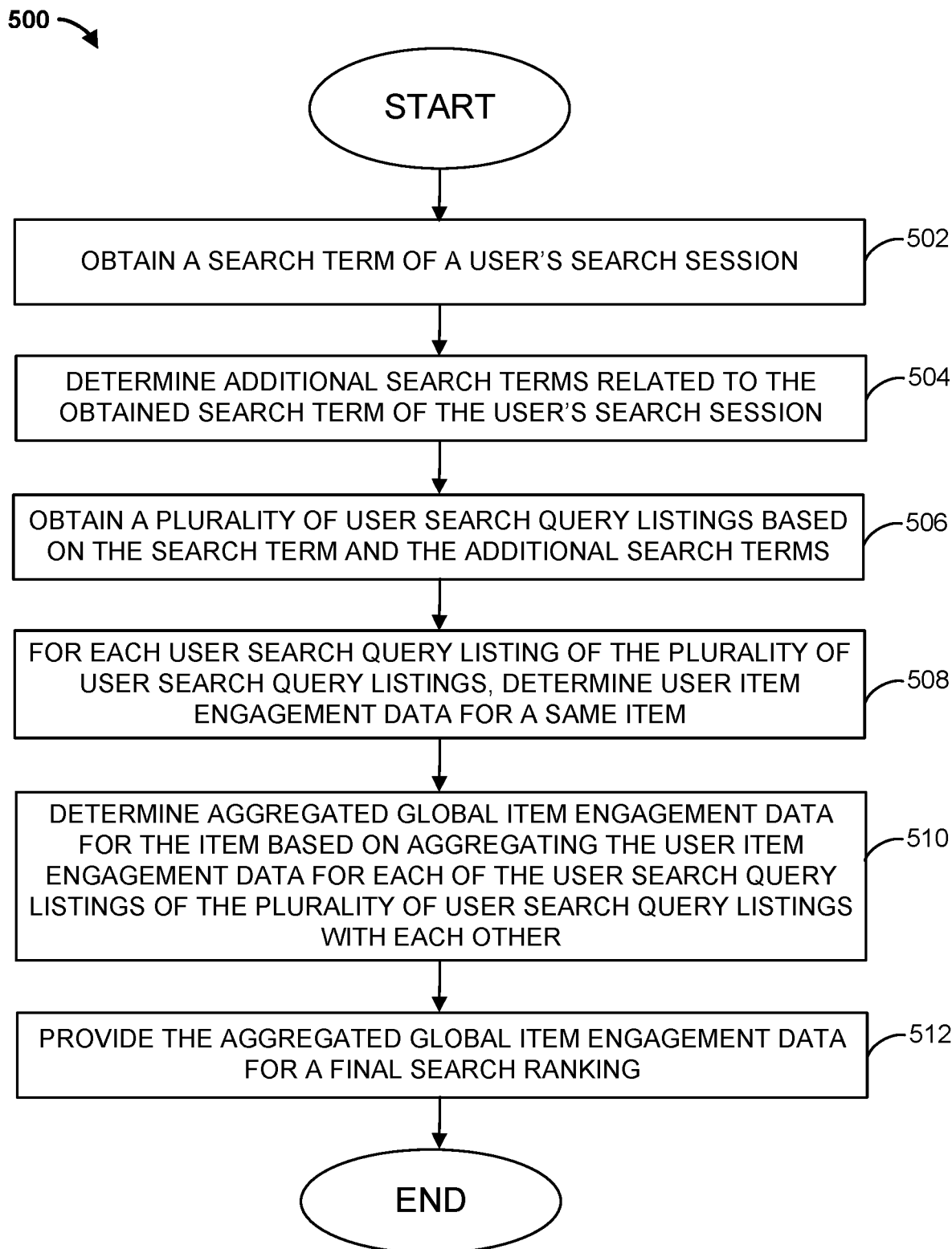
FIG. 5 is a flowchart of another example method that can be carried out by the e-commerce search ranking system of FIG. 1 in accordance with some embodiments.

FIG. 5 is a flowchart of another example method 500 that can be carried out by the search ranking computing device 102 of FIG. 1. At step 502, a search term of a user's search user is obtained. The search term can be obtained, for example, from database 116 of FIG. 1. At step 504, additional search terms related to the originally obtained search term are determined. At step 506, a plurality of user search query listings are obtained based on the originally obtained search term and the additional search terms. For each user search query listing of the plurality of user search query listings, user item engagement data for a same item is determined at step 508. At step 510, aggregated global item engagement data for the item is determined based on aggregating with each other user item engagement data for each of the obtained user search query listings. At step 512, the aggregated global item engagement data is provided for a final search ranking.

Figure 6:
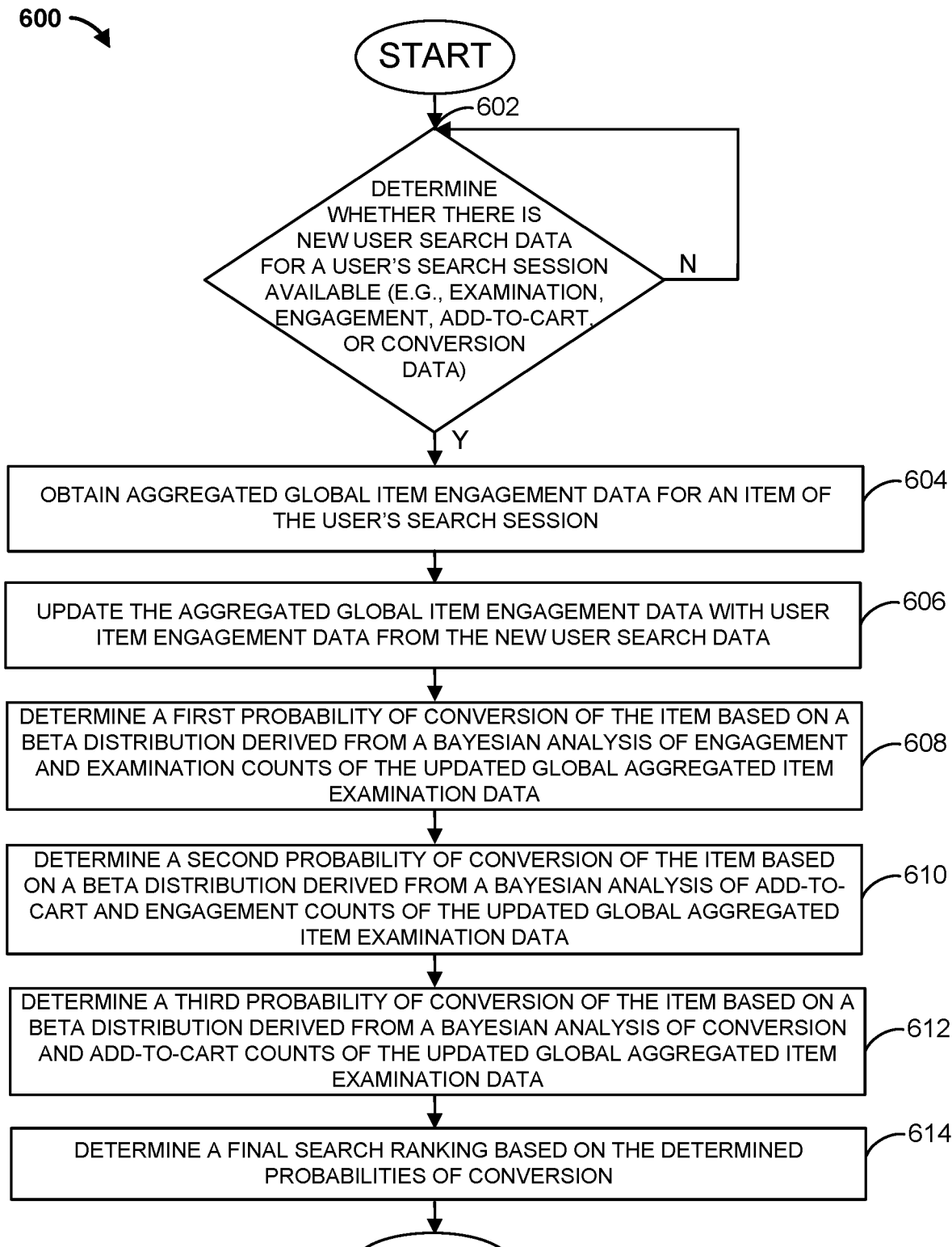
FIG. 6 is a flowchart of yet another example method that can be carried out by the e-commerce search ranking system of FIG. 1 in accordance with some embodiments.

FIG. 6 is a flowchart of yet another example method 600 that can be carried out by the search ranking computing device 102 of FIG. 1. At step 602, a determination is made as to whether there is new user search data for a user's search session available. For example, search ranking computing device 102 can determine whether additional user search query listings are available from database 116. Once there is new user search data available, the method proceeds to step 604 where aggregated global item engagement data for an item of the user's search session is obtained. At step 606, the aggregated global item engagement data for the item is updated with user item engagement data from the new user search data. For example, search ranking computing device 102 can update the aggregated global item engagement data in database 116.

At step 608, a first probability of conversion of the item is determined based on a first beta distribution derived from a first Bayesian analysis of an engagement count and an examination count of the updated aggregated global item engagement data. At step 610, a second probability of conversion of the item is determined based on a second beta distribution derived from a second Bayesian analysis of an item add-to-cart count and the item engagement count of the updated aggregated global item engagement data. At step 612, a third probability of conversion of the item is determined based on a third beta distribution derived from a third Bayesian analysis of a conversion count and the item add-to-cart count of the updated aggregated global item engagement data. At step 614, a final search ranking is determined based on the determined probabilities of conversion. For example, the final search ranking can be determined in response to a new search request.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a database;
a computing device configured to:
obtain a user search query listing identifying a search term and corresponding search results identifying a plurality of items of a user's search session from the database;
determine, based on the user search query listing, a first item of the plurality of items that the user selected;
determine, based on the user search query listing, a second item of the plurality of items appearing in the search results before the first item;

generate user item engagement data for each of the plurality of items of the user search query listing based, at least in part, on the determination of the first item that the user selected and the determination of the second item appearing in the search results before the first item, wherein the user item engagement data for each of the first item and the second item comprises at least an item examination count, an item engagement count, an item add-to-cart count, and an item conversion count, wherein the item engagement count for the first item indicates that the user engaged the first item, the item examination count for the first item indicates the user reviewed the first item, the item engagement count for the second item indicates the user did not engage the second item, and the item examination count for the second item indicates the user reviewed the second item;

determine a probability of a conversion of each of the first item and the second item based on a beta distribution derived from a Bayesian analysis of the corresponding user item engagement data comprising:

determining a first probability of conversion based on a first beta distribution of the item engagement count and the item examination count;

determining a second probability of conversion based on a second beta distribution of the item add-to-cart count and the item engagement count; and determining a third probability of conversion based on a third beta distribution of the item conversion count and the item add-to-cart count; and generate a ranking value based on applying a first weight to the first probability of conversion, a second weight to the second probability of conversion, and a third weight to the third probability of conversion;

receive a request to rank at least one of the plurality of items;

rank the at least one of the plurality of items based on the generated ranking values to generate a final item ranking; and provide the final item ranking for display of the at least one of the plurality of items.

2. The system of claim 1, wherein determining the first item that the user selected comprises determining that the user added the first item to a shopping cart for purchase.

3. The system of claim 1, wherein the computing device is further configured to store the user item engagement data to the database.

4. The system of claim 1 wherein the user item engagement data comprises an item examination count and an item engagement count for each of the plurality of items of the user search query listing.

5. The system of claim 1, wherein
the first beta distribution is derived from a first Bayesian analysis of the item engagement count and the item examination count;
the second beta distribution is derived from a second Bayesian analysis of the item add-to-cart count and the item engagement count; and
the third beta distribution is derived from a third Bayesian analysis of the item conversion count and the item add-to-cart count.

6. The system of claim 1, wherein the computing device is configured to use a lower quantile of the beta distribution to determine the probability of the conversion of the first item when the user item engagement data indicates an engagement count is within a threshold.

7. A method by a computing device comprising:

obtaining a user search query listing identifying a search term and corresponding search results identifying a plurality of items of a user's search session from a database;

determining, based on the user search query listing, a first item of the plurality of items that the user selected;

determining, based on the user search query listing, a second item of the plurality of items appearing in the search results before the first item;

generating user item engagement data for each of the plurality of items of the user search query listing based, at least in part, on the determination of the first item that the user selected and the determination of the second item appearing in the search results before the first item, wherein the user item engagement data for each of the first item and the second item comprises at least an item examination count, an item engagement count, an item add-to-cart count, and an item conversion count, wherein the item engagement count for the first item indicates that the user engaged the first item, the item examination count for the first item indicates the user reviewed the first item, the item engagement count for the second item indicates the user did not engage the second item, and the item examination count for the second item indicates the user reviewed the second item;

determining a probability of a conversion of each of the first item and the second item based on a beta distribution derived from a Bayesian analysis of the corresponding user item engagement data comprising:

determining a first probability of conversion based on a first beta distribution of the item engagement count and the item examination count;

determining a second probability of conversion based on a second beta distribution of the item add-to-cart count and the item engagement count; and determining a third probability of conversion based on a third beta distribution of the item conversion count and the item add-to-cart count; and generate a ranking value based on applying a first weight to the first probability of conversion, a second weight to the second probability of conversion, and a third weight to the third probability of conversion;

receiving a request to rank at least one of the plurality of items;

ranking the at least one of the plurality of items based on the generated ranking values to generate a final item ranking; and providing the final item ranking for display of the at least one of the plurality of items.

8. The method of claim 7 wherein determining the first item that the user selected comprises determining that the user added the first item to a shopping cart for purchase.

9. The method of claim 7 further comprising storing the user item engagement data to the database based on the search term of the user's search session.

10. The method of claim 7 wherein the user item engagement data comprises an item examination count and an item engagement count for each of the plurality of items of the user search query listing.

11. The method of claim 7 wherein
the first beta distribution is derived from a first Bayesian analysis of the item engagement count and the item examination count;
the second beta distribution is derived from a second Bayesian analysis of the item add-to-cart count and the item engagement count; and
the third beta distribution is derived from a third Bayesian analysis of the item conversion count and the item add-to-cart count.

12. The method of claim 7 further comprising using a lower quantile of the beta distribution to determine the probability of the conversion of the first item when the user item engagement data indicates an engagement count is within a threshold.

13. A non-transitory, computer-readable storage medium comprising executable instructions that, when executed by one or more processors, cause the one or more processors to:
obtain a user search query listing identifying a search term and corresponding search results identifying a plurality of items of a user's search session from a database;
determine, based on the user search query listing, a first item of the plurality of items that the user selected;
determine, based on the user search query listing, a second item of the plurality of items appearing in the search results before the first item;
generate user item engagement data for each of the plurality of items of the user search query listing based, at least in part, on the determination of the first item that the user selected and the determination of the second item of the plurality of items appearing in the search results before the first item, wherein the user item engagement data for each of the first item and the second item comprises at least an item examination count, an item engagement count, an item add-to-cart count, and an item conversion count, wherein the item engagement count for the first item indicates that the user engaged the first item, the item examination count for the first item indicates the user reviewed the first item, the item engagement count for the second item indicates the user did not engage the second item, and the item examination count for the second item indicates the user reviewed the second item;
determine a probability of a conversion of each of the first item and the second item based on a beta distribution derived from a Bayesian analysis of the corresponding user item engagement data comprising:
determining a first probability of conversion based on a first beta distribution of the item engagement count and the item examination count;
determining a second probability of conversion based on a second beta distribution of the item add-to-cart count and the item engagement count; and
determining a third probability of conversion based on a third beta distribution of the item conversion count and the item add-to-cart count; and
generate a ranking value based on applying a first weight to the first probability of conversion, a second weight to the second probability of conversion, and a third weight to the third probability of conversion;
receive a request to rank at least one of the plurality of items;
rank the at least one of the plurality of items based on the generated ranking values to generate a final item ranking; and
provide the final item ranking for display of the at least one of the plurality of items.

14. The non-transitory computer-readable storage medium of claim 13, wherein the executable instructions, when executed by the one or more processors, cause the one or more processors to determine the first item that the user selected by determining that the user added the first item to a shopping cart for purchase.

15. The non-transitory computer-readable storage medium of claim 13 wherein the executable instructions, when executed by the one or more processors, cause the one or more processors to store the user item engagement data to the database based on the search term of the user's search session.

16. The non-transitory computer-readable storage medium of claim 14 wherein
the first beta distribution is derived from a first Bayesian analysis of an item engagement count and an item examination count of the user item engagement data;
the second beta distribution is derived from a second Bayesian analysis of an item add-to-cart count and the item engagement count of the user item engagement data; and
the third beta distribution is derived from a third Bayesian analysis of an item conversion count and the item add-to-cart count of the user item engagement data.

17. The non-transitory computer-readable storage medium of claim 13, wherein the executable instructions, when executed by the one or more processors, cause the one or more processors to use a lower quantile of the beta distribution to determine the probability of the conversion of the first item when the user item engagement data indicates an engagement count is within a threshold.

\* \* \* \* \*